US010870364B2

(12) United States Patent
Mere (10) Patent No.: US 10,870,364 B2
(45) Date of Patent: Dec. 22, 2020

(54) METHOD FOR AUTONOMOUS CHARGING OF A MOTOR VEHICLE

(71) Applicant: Bedestrian LLC, Ann Arbor, MI (US)

(72) Inventor: Shadi Mere, Ann Arbor, MI (US)

(73) Assignee: Bedestrian LLC, Ann Arbor, MI (US)

( * ) Notice: Subject to any disclaimer, the term of this patent is extended or adjusted under 35 U.S.C. 154(b) by 376 days.

(21) Appl. No.: 15/953,041

(22) Filed: Apr. 13, 2018

(65) Prior Publication Data

US 2019/0315236 A1    Oct. 17, 2019

(51) Int. Cl.
*B60L 53/38* (2019.01)
*H02J 7/02* (2016.01)
*B60L 55/00* (2019.01)
*B60L 53/65* (2019.01)

(52) U.S. Cl.
CPC ............. *B60L 53/38* (2019.02); *B60L 53/65* (2019.02); *B60L 55/00* (2019.02); *H02J 7/025* (2013.01)

(58) Field of Classification Search
CPC .......... B60L 53/38; B60L 55/00; B60L 53/65; H02J 7/025
See application file for complete search history.

(56) References Cited

U.S. PATENT DOCUMENTS

| 10,663,968 B2* | 5/2020 | Mere ................... G05D 1/0278 |
| 2010/0065344 A1* | 3/2010 | Collings, III ............ B60L 3/10 180/2.1 |
| 2019/0001833 A1* | 1/2019 | Coburn .................. B60L 53/14 |
| 2019/0009756 A1* | 1/2019 | Jacobs ..................... B60S 5/00 |

* cited by examiner

*Primary Examiner* — Richard V Muralidar (57) ABSTRACT

A method for autonomously charging an electric motor vehicle based on a customer order using an autonomous vehicle having electric battery storage includes receiving a request to charge the electric motor vehicle, loading into a memory of the autonomous vehicle a customer profile that includes a location of the electric motor vehicle, a vehicle identifier, and an electric charge amount, autonomously driving to the location of the electric motor vehicle, identifying the electric motor vehicle based on the vehicle identifier, and charging the electric motor vehicle.

13 Claims, 13 Drawing Sheets

METHOD FOR AUTONOMOUS CHARGING OF A MOTOR VEHICLE

TECHNICAL FIELD

The present invention generally relates to the field of autonomous vehicles and, more specifically to autonomous vehicles with trailers and methods that are configured to carry and deliver items from one location to another.

BACKGROUND

The statements in this section merely provide background information related to the present disclosure and may or may not constitute prior art.

Delivery truck drivers and salespeople pick up, transport, and drop off packages, food delivery, prescription drugs, and small shipments within a local region or urban area. Merchandise is transported from a distribution center, or local business to other businesses and households. The delivery service is fragmented, unoptimized logistically, and many areas are underserved, and services are limited to certain times of the day and week instead of twenty-four hours seven days a week, year around. The vehicles used in delivery most often do not have storage with a temperature-controlled compartment to carry cold or hot features for temperature sensitive goods, in addition, these vehicles do not have sensors such as weight, temperature humidity, etc. to monitor the environmental conditions of the cargo. Other vehicles do not deliver to the last step or at the door services due to stairs or elevators, they deliver only to the curbside. In addition, drivers and workers have low average wages, and poor benefits. The carbon footprint of the delivery industry is large and has large negative consequences on the environment in congestion and pollution.

There is also a demand for moving small items that do not fit small or medium size cars for consumers. A consumer who buys a chair or a big painting for example has to rent a trailer or a small truck, or alternatively pay for delivery with longer wait times and inconvenient delivery time and higher cost as a percentage of the item purchased.

Therefore, there is a need for a more efficient and convenient system for delivering items or goods from one location to another. The delivery system should be autonomous and reduce the need for human intervention in the task of delivering an item.

SUMMARY

In an embodiment of present invention, an electric micro semi-truck vehicle includes of a robot vehicle and a trailer dynamically connected thereto. The micro semi-truck is guided by a combination of an autonomous system, as well as a system remotely monitored by humans. The robot vehicle is powered by a battery and has its own temperature-controlled storage and is disengable from the trailer to make deliveries. The trailer has its own battery and is capable of navigating as an independent vehicle and make deliveries or follow another vehicle. Both the robot vehicle and the trailer are used for delivering goods, services, and humans, they both have storage compartments that are temperature controlled. The vehicles operate with mobility-as-a-service purpose for on demand and scheduled service relating to delivery, as well as trailing behind other vehicle attached or unattached to carry goods. The robot vehicle and trailer operate as an autonomous delivery system for delivering goods and services on open roads and sidewalks, and enclosed spaces such as hospitals, prisons, municipal and government facilities, care facilities and industrial facilities.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

The following description is merely exemplary in nature and is not intended to limit the present disclosure, application, or uses.

With reference to FIGS. 1-4, an autonomous vehicle is generally indicated by reference number 10. The autonomous vehicle 10 is generally used for transporting an item from at least a first location to at least a second location autonomously. The first location and the second location may be in any number of places within a locality or range of the autonomous vehicle 10. For example, specific use cases of the autonomous vehicle 10 include transporting medicine between various locations in a hospital, transporting lab equipment within a lab, transporting items within an office building or warehouse, transporting items from a distribution hub to a residence, etc. Thus, the autonomous vehicle 10 is sized to navigate effectively indoors and has performance characteristics sufficient to operate on roads.

The autonomous vehicle 10 generally includes a drive assembly 12, a vehicle body 14, and a display assembly 16. The drive assembly 12 includes a vehicle frame 18 that supports a first set of guide wheels 20A and a second set of guide wheels 20B. The first set of guide wheels 20A are rotatably mounted on a first side 18A of the vehicle frame 18 and the second set of guide wheels 20B are rotatably mounted on a second side 18B of the vehicle frame 18. In the example provided, each set of guide wheels 20A, 20B include three guide wheels, though it should be appreciated that more or less guide wheels may be employed. A first road wheel 22A is rotatably engaged with the first set of guide wheels 20A while a second road wheel 22B is rotatably engaged with the second set of guide wheels 20B.

A pair of electric motors 24 (only one of which is shown schematically in FIG. 4) are mounted within the vehicle frame 18. Each electric motor 24 drives an output shaft 26 (only one of which is shown). The output shafts 26 are each connected to rotate a drive wheel 28 (only one of which is shown). Each drive wheel 28 is rotatably engaged with one of the road wheels 22A, 22B. The electric motors 24 supply a driving force to the drive wheels 28 and thus to the road wheels 22A, 22B to move the autonomous vehicle 10. The electric motors 24 may be operated independently and rotated in two directions, thus allowing the autonomous vehicle 10 to move forward, backwards, and to turn left and right depending on which of the electric motors 24 is activated and in which direction the output shafts 26 are rotated. In one example, a third road wheel or rear wheel 30 is mounted to a rear 31 of the vehicle frame 18 to help support the autonomous vehicle 10. The rear wheel 30 may be covered by a housing 32 and may pivot with respect to the vehicle frame 18. An example of a drive assembly 12 is described in FR3052739A1 filed Jun. 21, 2016, herein incorporated by reference in its entirety.

The vehicle body 14 is mounted to the drive assembly 12 and generally provides storage and mounting points for various features of the autonomous vehicle 10. The vehicle body 14 includes exterior side walls 40 and interior walls 42. The exterior side walls 40 are connected to the side walls 18A, 18B of the vehicle frame 18 of the drive assembly 12. The interior walls 42 define a first compartment 44 and a second compartment, or delivery portal, 46. The first compartment 44 is accessible via a first opening 48 located on a top surface 50 of the vehicle body 14. A door 52 is rotatably hinged to the top surface 50 and selectively covers the first opening 48. The second compartment 46 is accessible via a second opening 54 located on a front side 56 of the vehicle body 14. A drawer 58 is slidably disposed within the second compartment 46. In one embodiment, the door 52 is actuated by a device 60 such as an electric motor, servo, or other actuator. The device 60 opens and closes the door 52 to allow access into the first compartment 44. Likewise, the drawer 58 is actuated by a device 62, such as an electric motor coupled to a rack and pinion or a servo controlled armature, to slide the drawer 58 out of and into the compartment 44. In another embodiment, the drawer 58 includes a hinged bottom 66. When the drawer 58 is extended out from the vehicle body 14, the hinged bottom 66 pivots down and drops any object disposed in the drawer 58. When the drawer 58 is retracted into the vehicle body 14, the hinged bottom 66 is forced to pivot closed as the drawer 58 moves into the vehicle body 14. In yet another embodiment, the first compartment 44 communicates with the second compartment 46 within the vehicle body 14. Thus, an object placed in the first compartment 44 when the door 52 is open will drop into the drawer 58 in the second compartment 46. Both the door 52 and the drawer 58 may include locking mechanisms that prevent the door 52 and the drawer 58 from opening.

In one embodiment, a temperature control device 67 is connected to the first compartment 44 and/or the second compartment 46. The temperature control device 67 is a heating and/or cooling mechanism that is configured to regulate a temperature of the environment within the first compartment 44 and/or the second compartment 46. The vehicle body 14 may include insulation surrounding the compartments 44, 46 to assist in temperature control.

Figure 1:
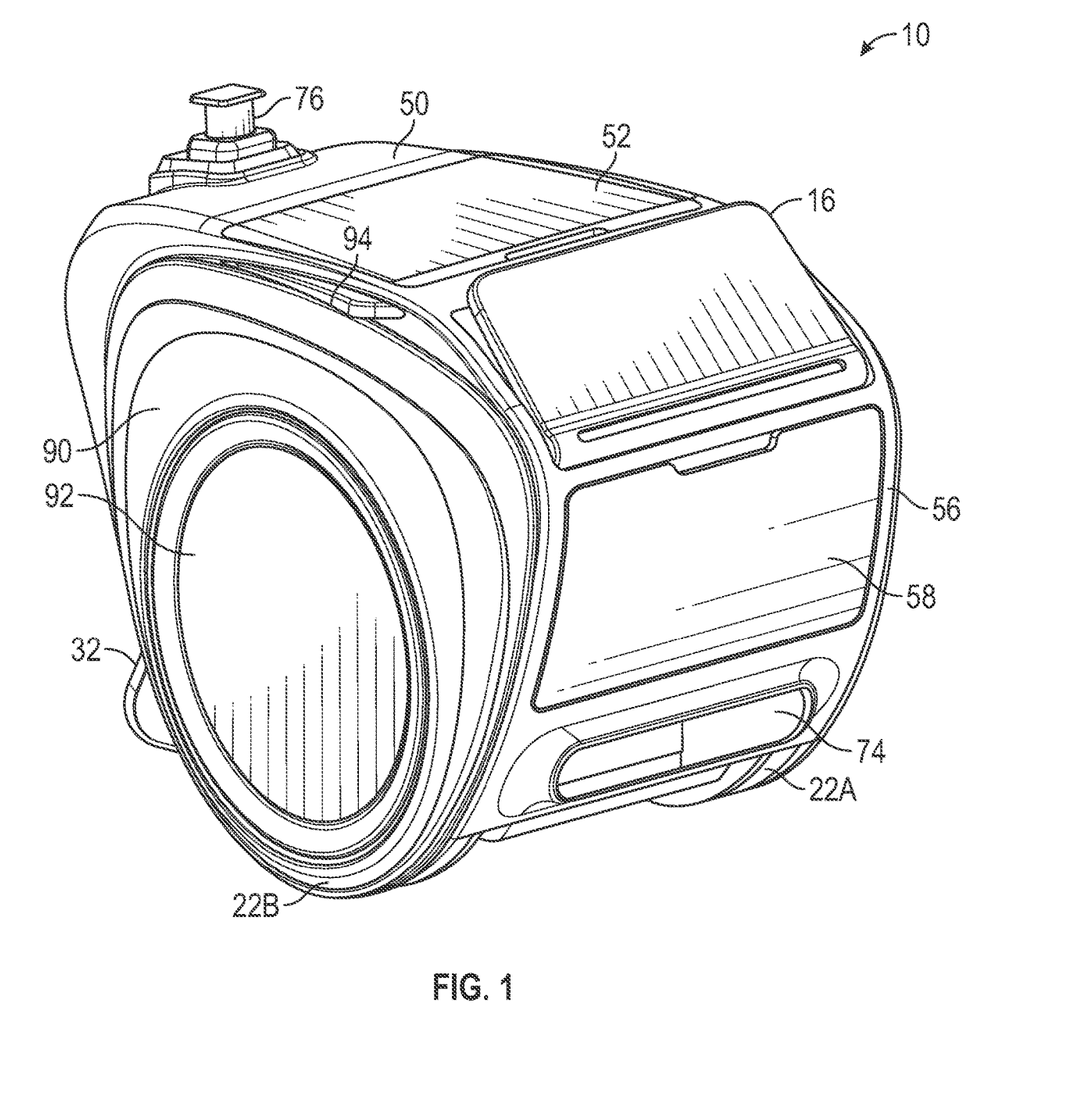
FIG. 1 is a front perspective view of an exemplary autonomous vehicle.
Figure 2:
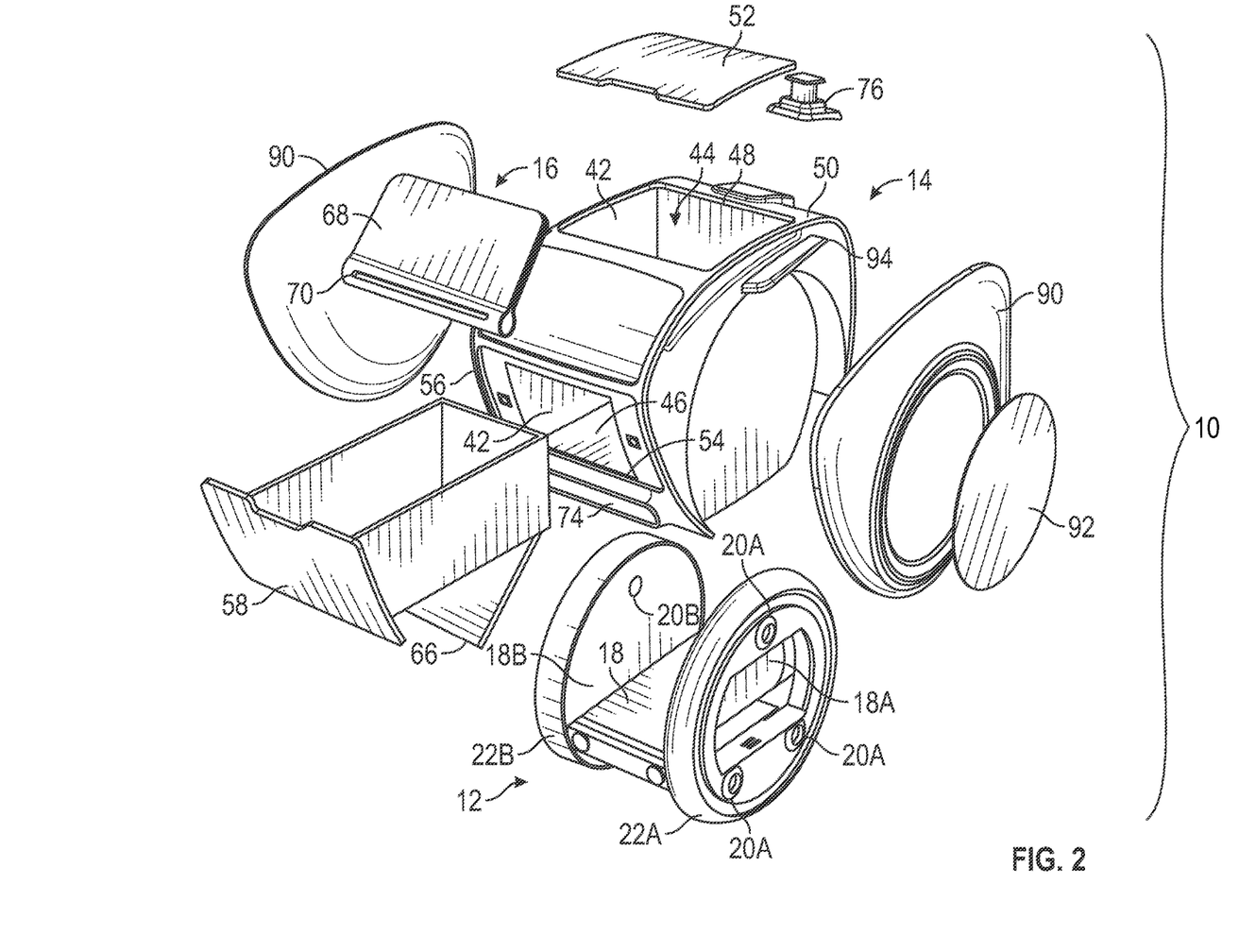
FIG. 2 is an exploded front perspective view of the autonomous vehicle.
Figure 3:
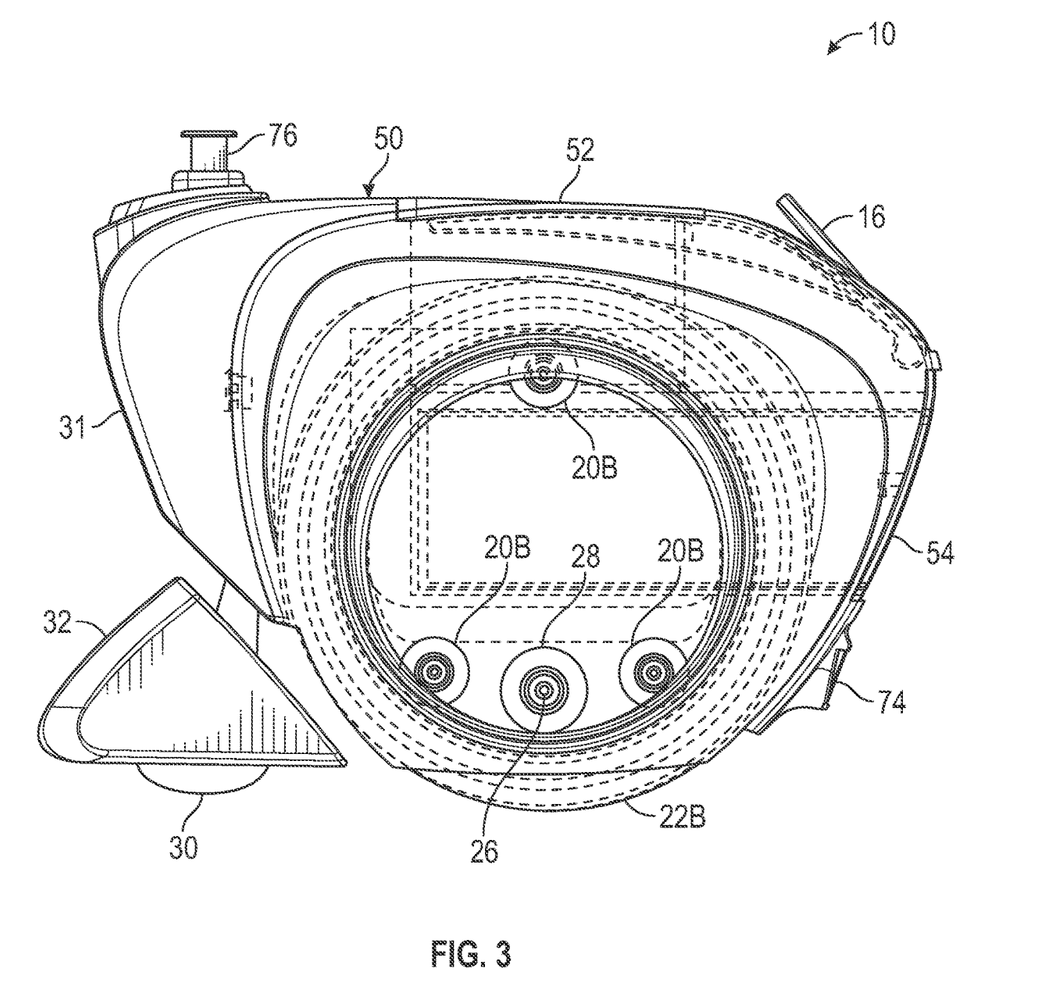
FIG. 3 is a partial side cross-sectional view of the autonomous vehicle.
Figure 4:
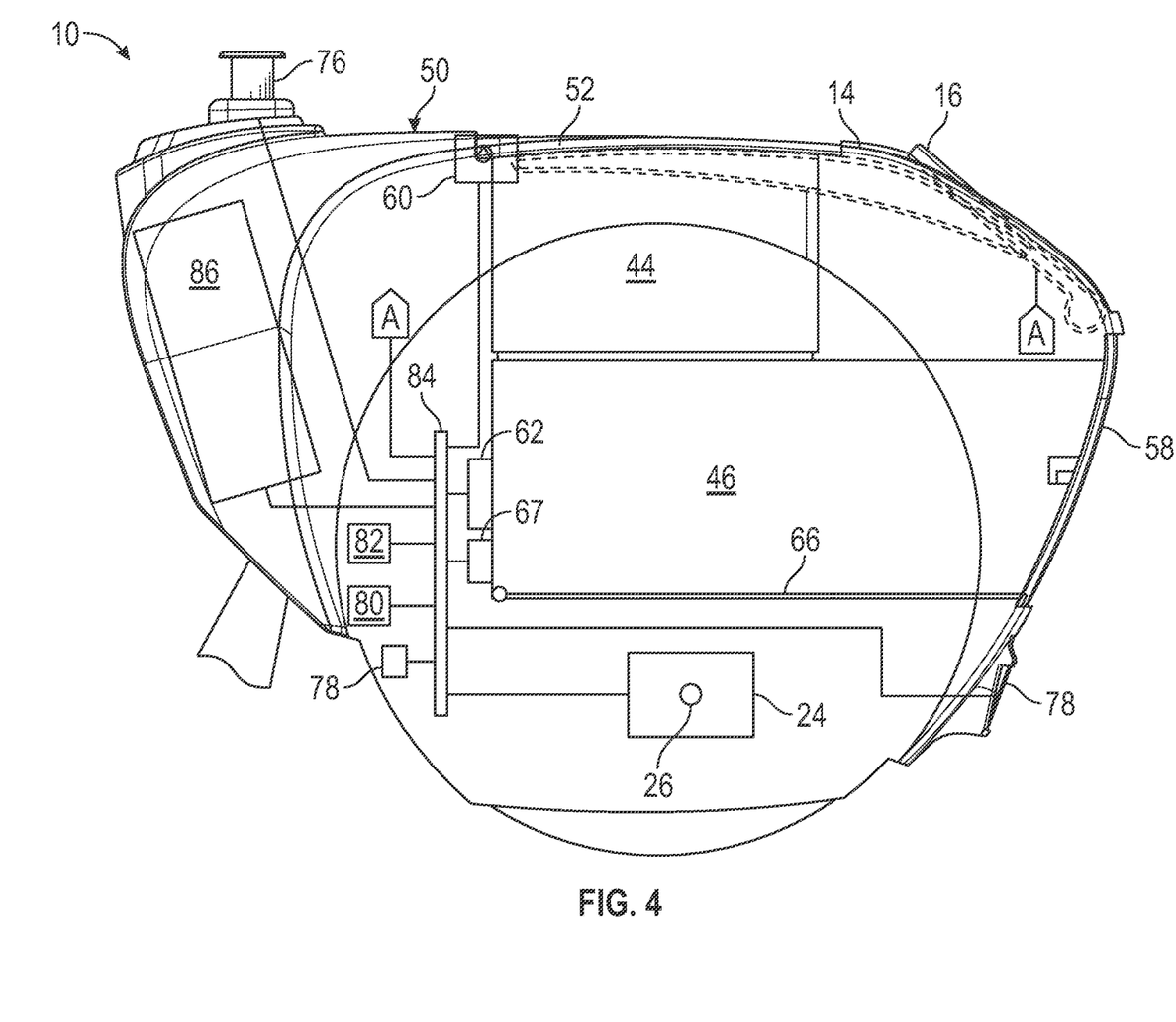
FIG. 4 is a side schematic view of the autonomous vehicle.

The display assembly 16 is attached to the front side 56 of the vehicle body 14 above the second opening 54. The display assembly 16 includes a touchscreen user interface and display 68 for receiving and displaying information. In one embodiment, a lighting bar 70 is mounted to the display assembly 16 to provide information regarding use, visibility, feedback, etc. In another embodiment, one or more cameras or depth sensors is mounted to the display assembly 16 to read gestures, detect facial features, assist in the user interface of the touchscreen display 68, etc. In yet another embodiment, the display assembly 16 is hinged to the vehicle body 14. The display assembly 16 is moveable between at least a first position and a second position relative to the vehicle body 14. In the first position, the display assembly 16 is rotated away from the vehicle body 14, as shown in FIG. 1. When in the first position, the autonomous vehicle 10 operates normally. When the display assembly 16 is moved to the second position, shown in FIG. 4, the display assembly 16 is rotated adjacent the vehicle body 14 and a stop command is generated to halt the autonomous vehicle 10. Thus, the display assembly 16 acts as an easily accessible quick stop mechanism to interrupt the travel of the autonomous vehicle 10.

The autonomous vehicle 10 further includes a sensor suite used to provide lane and path navigation as well as object detection. In the example provided, the sensor suite includes front sensors 74 and a LiDAR sensor 76. The front sensors 74 may include cameras or ultrasonic sensors. The front sensors 74 are mounted to a forward-facing portion of the drive assembly 12, though the front sensors 74 may be mounted to the vehicle body 14. The LiDAR sensor 76 is mounted to the top surface 50 of the vehicle body 14 to allow for 360-degree detection. The autonomous vehicle 10 may have additional sensors disposed around the vehicle body 14.

To further assist in autonomous driving, the autonomous vehicle 10 includes a GPS module 78 and a transmitter/receiver module 80. The GPS module 78 provides real-time satellite global positioning of the autonomous vehicle 10. The transmitter/receiver module 80 is configured to communicate wirelessly using various communication protocols (Bluetooth, WiFi, LTE, etc.) with a remote operator. The wireless communication may include vehicle-to-vehicle (V2V), vehicle-to-infrastructure (V2I), vehicle-to-pedestrian (V2P), vehicle-to-device (V2D), and vehicle-to-grid (V2G) communications.

The autonomous vehicle 10 includes a control module 82 that communicates with the display assembly 16, the electric motors 24, the actuation devices 60 and 62, the temperature control device 67, the front sensors 74, and the LiDAR sensor 76 via a CAN, wire harness, or other wiring network 84. The control module 82 is a specific purpose controller having, generally, a processor and a memory device having routines accessible by the processor. The processor may be any conventional processor, such as commercially available CPUs, dedicated application-specific integrated circuit (ASIC), or other hardware-based processor. The memory device may be any computing device readable medium such as hard-drives, solid state memory, ROM, RAM, DVD or any other medium that is capable of storing information that is accessible by the processor. The control module 82 may also be a micro-controller having a micro-processor, memory device, and other peripherals embedded on a single integrated circuit. Although only one control module 82 is shown, it is understood that the autonomous vehicle 10 may include multiple controllers or micro-controllers. The routines include algorithms for generating path and lane data, object detection, image analysis, GPS and object detection fusion, algorithms for generating commands to control the actuation devices 60, 62 and the electric motors 24, and other routines used to autonomously control the autonomous vehicle 10. The control module 82, the display assembly 16, the electric motors 24, the actuation devices 60 and 62, the temperature control device 67, the front sensors 74, and the LiDAR sensor 76 are powered by a power source 86, such as one or more electric batteries.

The autonomous vehicle 10 includes side panels 90 that are connected to the exterior side walls 40 of the vehicle body 14. The side panels 90 protect debris or other objects from being caught between the road wheels 22A, 22B and the vehicle body 14. Wheel or hub caps 92 may be attached to the side panels 90 to display emblems or other information. In one embodiment the wheel caps 92 are magnetically attached to the side panels 90 for easy replacement. In another embodiment, the autonomous vehicle 10 includes side lights 94 mounted on the vehicle body 14.

The autonomous vehicle 10 may be used to autonomously transport objects between locations. For example, a user may call the autonomous vehicle 10 to her location using a phone that communicates with the autonomous vehicle 10 using V2D communication. The autonomous vehicle 10 then navigates to the location of the user and requests an input code or other identification from the user via the display assembly 16. The user then inputs the code, or the autonomous vehicle 10 uses facial identification, and opens the door 52. The user then places an object into the first compartment 44. Where the compartments 44 and 46 are connected, the object falls into the drawer 58. The user then indicates that the object has been loaded and a destination location, either by voice command or an input into the display assembly 16. Alternatively, the autonomous vehicle 10 may receive instructions remotely using V2I or V2D communication. The autonomous vehicle 10 then travels to the destination location using on-board autonomous driving routines and controls, as noted above. Once the autonomous vehicle 10 arrives at the destination, the drawer 58 may then be opened automatically and the object delivered or dropped when the hinged bottom 66 of the drawer 58 opens. Alternatively, autonomous vehicle 10 may request an input code or other identification via the display assembly 16 before unlocking the door 52 or the drawer 58.

Figure 5:
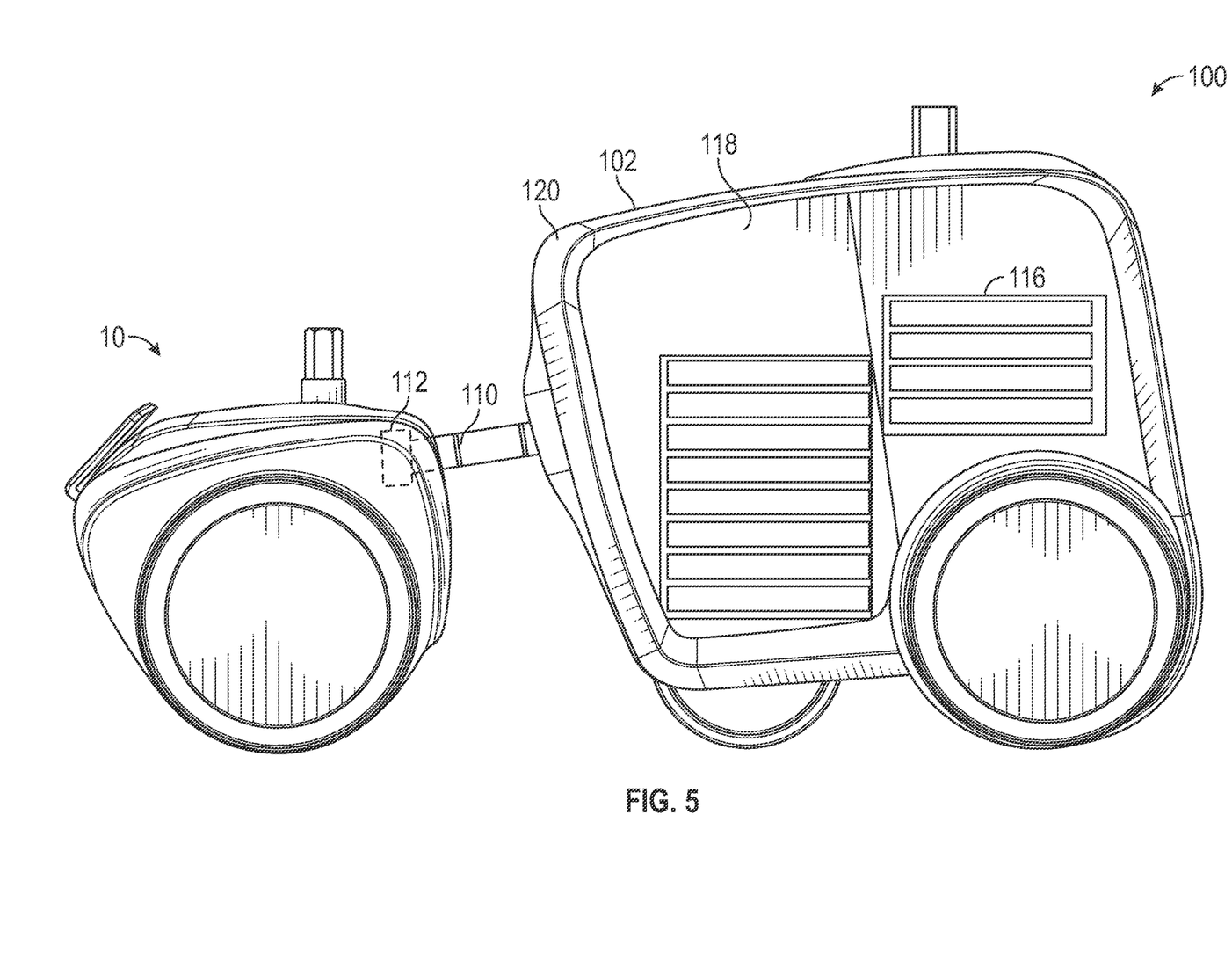
FIG. 5 is a side view of the autonomous vehicle with a trailer.
Figure 6:
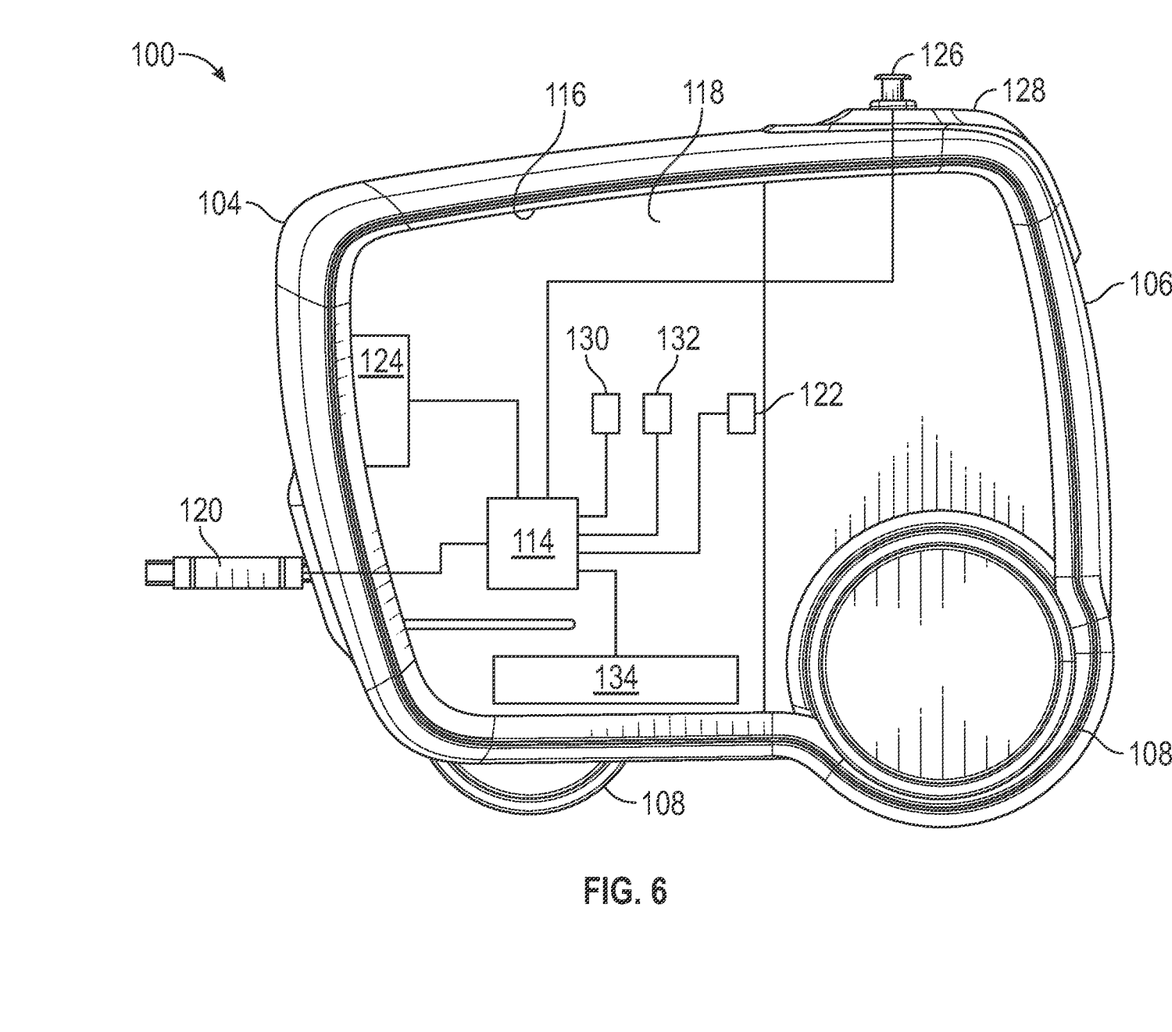
FIG. 6 is a schematic side view of the trailer.

Turning to FIGS. 5-6, the autonomous vehicle 10 is illustrated with a trailer 100. In one embodiment, the trailer 100 is towed by the autonomous vehicle 10. The trailer 100 includes a housing 102 having a front portion 104 and a rear portion 106. The housing is supported by three road wheels 108, only two of which are shown. The road wheels 108 include two located at the rear portion 106 and one located centrally at the front portion 104. It should be appreciated that the trailer 100 may include more or less than three road wheels 104. A hitch 110 connects the trailer 100 to the autonomous vehicle 10. The hitch 110 is connectable between the front portion 104 of the trailer 100 and the rear 31 of the autonomous vehicle 10. In one embodiment, the autonomous vehicle 10 includes an actuator 112 that engages and disengages with the hitch 110. Thus, the autonomous vehicle 10 may autonomously couple and decouple from the trailer 100. In one embodiment, the hitch 110 includes an electrical coupling to allow communication and/or energy transfer between the autonomous vehicle 10 and an electrical system 114 disposed in the trailer 100.

The housing 102 defines a storage area 116 therein for storing one or more objects. The storage area 116 is accessible by one or more doors 118 located on sides 120 of the housing 102. The storage area 116 and the doors 118 may have various configurations and shapes. A locking mechanism 122 communicates with the electrical system 114 and selectively locks and unlocks the door 118. In one embodiment, the trailer 100 includes a temperature control device 124 that is connected to the storage area 116 and is controlled by the electrical system 114. The temperature control device 124 is a heating and/or cooling mechanism that is configured to regulate a temperature of the environment within the storage area 116.

In one embodiment, the trailer 100 includes one or more sensors 126 in communication with the electrical system 114 and thus with the autonomous vehicle 10 when coupled by the hitch 110. In the example provided, the sensor 126 is located on a top surface 128 of the housing 104 near the rear portion 106. The sensor 126 may be a LiDAR sensor, an ultrasonic sensor, or a camera used to provide object information behind the trailer 100 to the autonomous vehicle 10.

In another embodiment, the trailer 100 includes a GPS module 130 and a transmitter/receiver module 132. The GPS module 130 provides real-time satellite global positioning of the trailer 100. The transmitter/receiver module 132 is configured to communicate wirelessly using various communication protocols (Bluetooth, WiFi, LTE, etc.) with a remote system. The wireless communication may include vehicle-to-vehicle (V2V), vehicle-to-infrastructure (V2I), vehicle-to-pedestrian (V2P), vehicle-to-device (V2D), and vehicle-to-grid (V2G) communications. The transmitter/receiver module 132 is configured to provide the location of the trailer 100 using the GPS coordinates from the GPS module 130.

The trailer 100 includes a power source 134 separate from the autonomous vehicle 10. The power source 134 may include one or more electric batteries in electrical communication with the electrical system 114. The power source 134 provides power to lock mechanism 122, the temperature control device 124, the sensor 126, the GPS module 130, and the transmitter/receiver module 132. When the trailer 100 is connected to the autonomous vehicle 10, the power source 134 may be used to power the autonomous vehicle 10, thus acting as a charging station or extended battery pack. In one embodiment, the power source 134 substantially fills the storage space 116 and provides a mobile charging station for multiple autonomous vehicles or electric passenger vehicles. The autonomous vehicle 10 may be in electrical communication with the autonomous trailer 200 via conduction or a plug-in connection.

The autonomous vehicle 10 and trailer 100 may be used to autonomously transport objects between locations. For example, a user may call the autonomous vehicle 10 to her location using a phone that communicates with the autonomous vehicle 10 using V2D communication. The autonomous vehicle 10 then navigates to the location of the user pulling the trailer 100 to the location. The autonomous vehicle 10 may then detach from the trailer 100 and leave the trailer 100 at the destination location. A user may then interact with the trailer 100 to deposit or retrieve an object within the storage space 116. The autonomous vehicle 10 may then return and reattach to the trailer 100 to move the trailer 100 to another location, as needed.

With reference to FIGS. 7-10, the autonomous vehicle 10 is shown with an autonomous trailer 200. The autonomous trailer 200 is generally used in conjunction or independently with the autonomous vehicle 10 for transporting one or more objects from at least a first location to at least a second location autonomously. The first location and the second location may be in any number of places within a locality or range of the autonomous trailer 200. The autonomous trailer 200 is similar to the trailer 100 but includes autonomous driving functionality, as will be described below.

Figure 7:
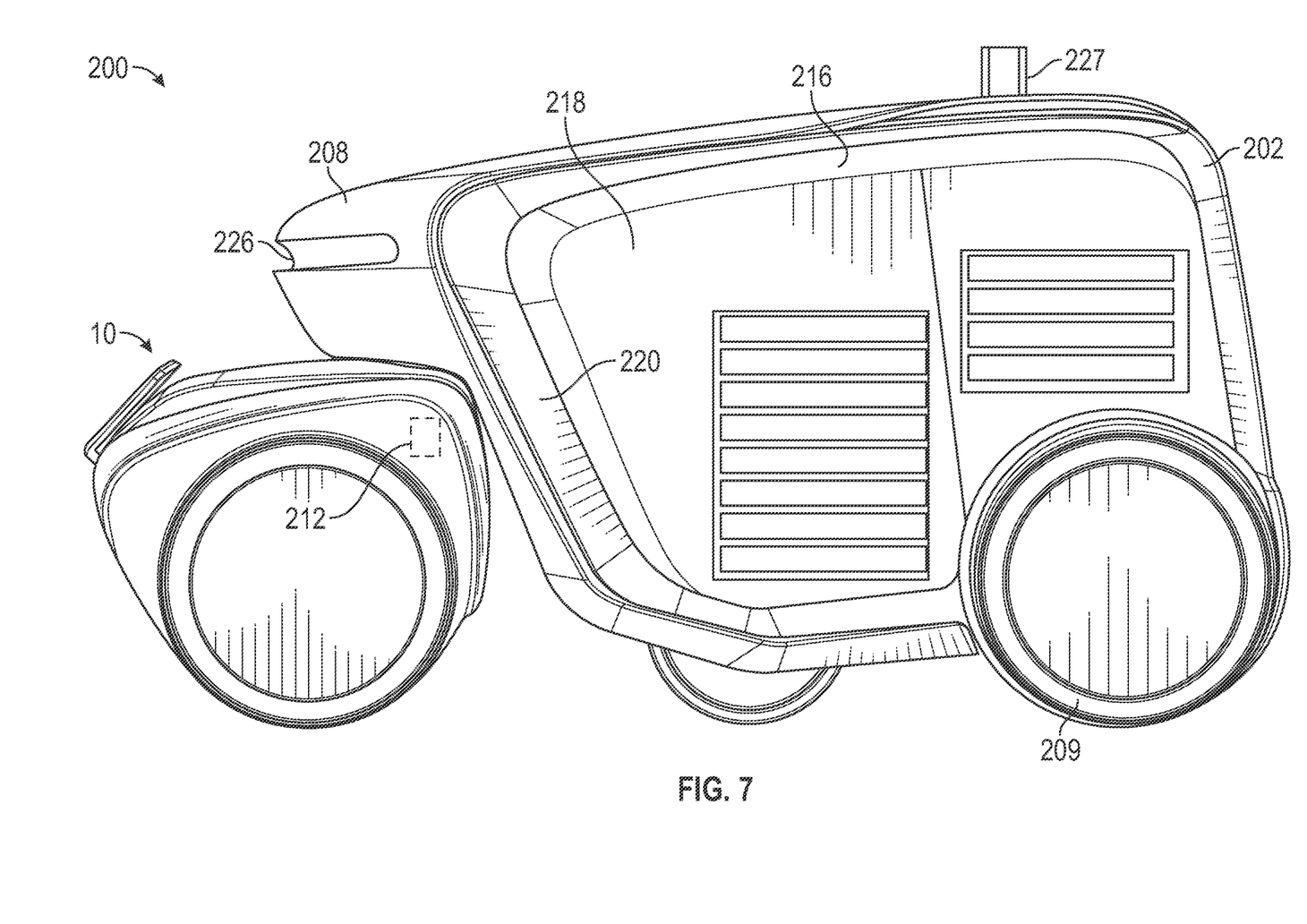
FIG. 7 is a side view of the autonomous vehicle with an autonomous trailer.
Figure 8:
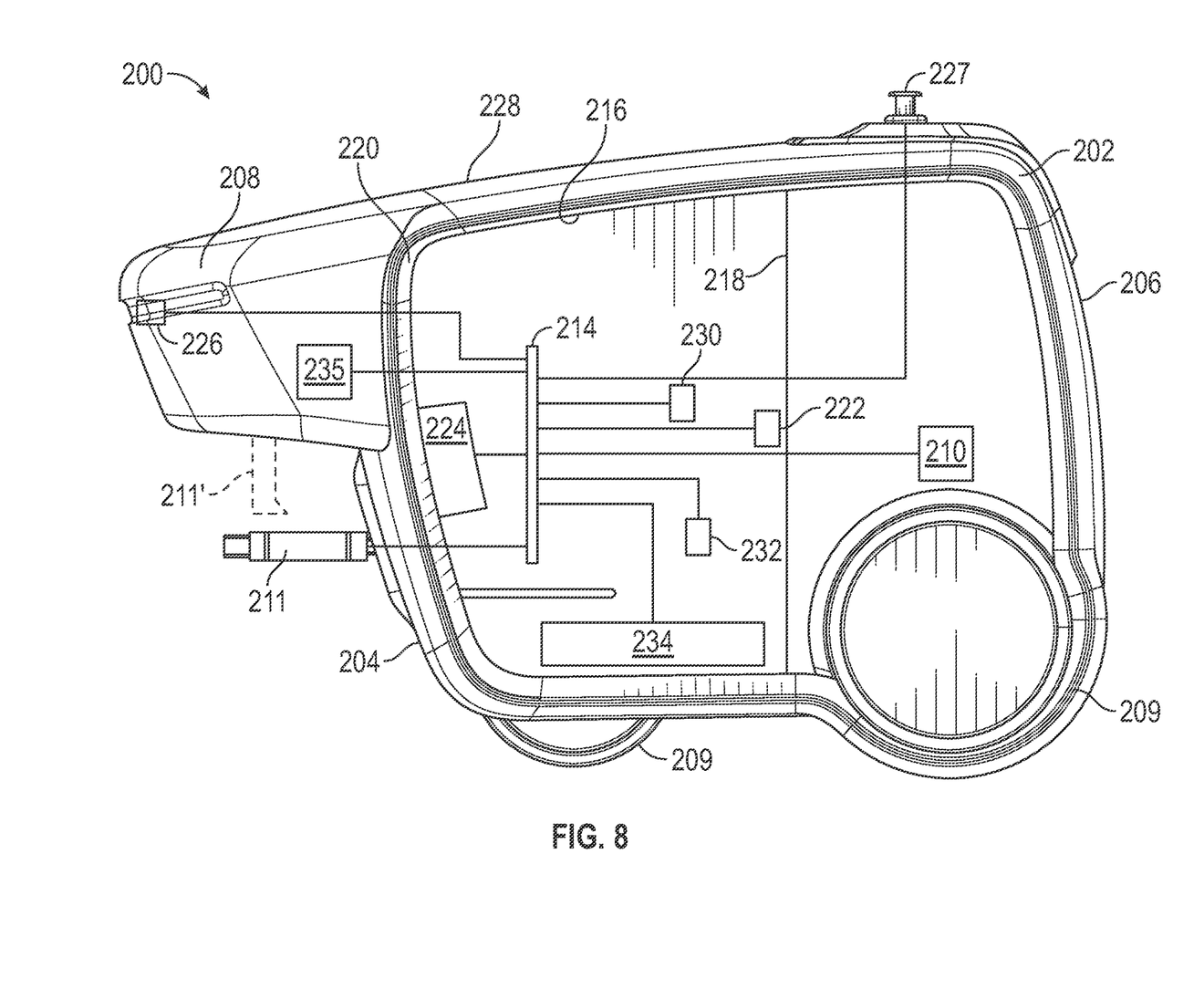
FIG. 8 is a schematic side view of the autonomous trailer.

The autonomous trailer 200 includes a housing 202 having a front portion 204 and a rear portion 206. The housing 202 includes a control section 208 located at the front portion 204. The housing is supported by three road wheels 209, only two of which are shown. The road wheels 209 include two located at the rear portion 206 and one located centrally at the front portion 204. It should be appreciated that the autonomous trailer 200 may include more or less than three road wheels 209. One or all of the road wheels 209 is driven by a drive mechanism 210. The drive mechanism 210 may be similar to the drive assembly 12 of the autonomous vehicle 10 and generally includes one or more electric motors that provide a drive force to the road wheels 209.

A hitch 211 connects the autonomous trailer 200 to the autonomous vehicle 10. The hitch 211 is connectable between the front portion 204 of the autonomous trailer 200 and the rear 31 of the autonomous vehicle 10. In an alternative embodiment, a hitch 211', indicated by dashed lines in FIG. 8, extends down from the control section 208 of the housing 202. The hitch 211' operates in substantially the same manner as the hitch 211 and therefore only the hitch 211 will be described herein. In one embodiment, the autonomous vehicle 10 includes an actuator 212 that engages and disengages with the hitch 211. Thus, the autonomous vehicle 10 may autonomously couple and decouple from the autonomous trailer 200. In one embodiment, the hitch 211 includes an electrical coupling to allow communication and/or energy transfer between the autonomous vehicle 10 and an electrical system 214 disposed in the autonomous trailer 200. Alternatively, the autonomous vehicle 10 may be in electrical communication with the autonomous trailer 200 via conduction.

The housing 202 defines a storage area 216 therein for storing one or more objects, items, packages, etc. The storage area 216 is accessible by one or more doors 218 located on sides 220 of the housing 202. The storage area 216 and the doors 218 may have various configurations and shapes. A locking mechanism 222 communicates with the electrical system 214 and selectively locks and unlocks the door 218. In one embodiment, the autonomous trailer 200 includes a temperature control device 224 that is connected to the storage area 216 and is controlled by the electrical system 214. The temperature control device 224 is a heating and/or cooling mechanism that is configured to regulate a temperature of the environment within the storage area 216.

The autonomous trailer 200 further includes a sensor suite used to provide lane and path navigation as well as object detection. In the example provided, the sensor suite includes front sensors 226 and a LiDAR sensor 227. The front sensors 226 may include cameras or ultrasonic sensors. The front sensors 226 are mounted to the control section 208 of the housing 202. The LiDAR sensor 227 is mounted to a top surface 228 of the housing 202 to allow for 360-degree detection. The autonomous trailer 200 may have additional sensors disposed around the housing 202. The front sensors 226 and the LiDAR sensor 227 are in communication with the electrical system 214 and thus with the autonomous vehicle 10 when coupled by the hitch 211.

The autonomous trailer 200 includes a GPS module 230 and a transmitter/receiver module 232. The GPS module 230 provides real-time satellite global positioning of the autonomous trailer 200. The transmitter/receiver module 232 is configured to communicate wirelessly using various communication protocols (Bluetooth, WiFi, LTE, etc.) with a remote system. The wireless communication may include vehicle-to-vehicle (V2V), vehicle-to-infrastructure (V2I), vehicle-to-pedestrian (V2P), vehicle-to-device (V2D), and vehicle-to-grid (V2G) communications. The transmitter/receiver module 232 is configured to provide the location of the autonomous trailer 200 using the GPS coordinates from the GPS module 230 and to assist in autonomous driving of the autonomous trailer 200.

The autonomous trailer 200 includes a power source 234 separate from the autonomous vehicle 10. The power source 234 may include one or more electric batteries in electrical communication with the electrical system 214. The power source 234 provides power to the drive mechanism 210, the lock mechanism 222, the temperature control device 224, the sensors 226, 227, the GPS module 230, and the transmitter/receiver module 232. When the autonomous trailer 200 is connected to the autonomous vehicle 10, the power source 234 may be used to power the autonomous vehicle 10, thus acting as a charging station or extended battery pack. In one embodiment, the power source 234 substantially fills the storage space 216 and provides a mobile charging station for multiple autonomous vehicles or electric passenger vehicles.

The autonomous trailer 200 includes a control module 235 that communicates with the electrical system 214. The control module 235 is a specific purpose controller having a processor and a memory device having routines accessible by the processor. The processor may be any conventional processor, such as commercially available CPUs, dedicated application-specific integrated circuit (ASIC), or other hardware-based processor. The memory device may be any computing device readable medium such as hard-drives, solid state memory, ROM, RAM, DVD or any other medium that is capable of storing information that is accessible by the processor. The control module 235 may also be a microcontroller having a micro-processor, memory device, and other peripherals embedded on a single integrated circuit. Although only one control module 235 is shown, it is understood that the autonomous trailer 200 may include multiple controllers or micro-controllers. The routines include algorithms for generating path and lane data, object detection, image analysis, GPS and object detection fusion, algorithms for generating commands to control the drive mechanism 210, and other routines used to autonomously control the autonomous trailer 200.

Figure 9:
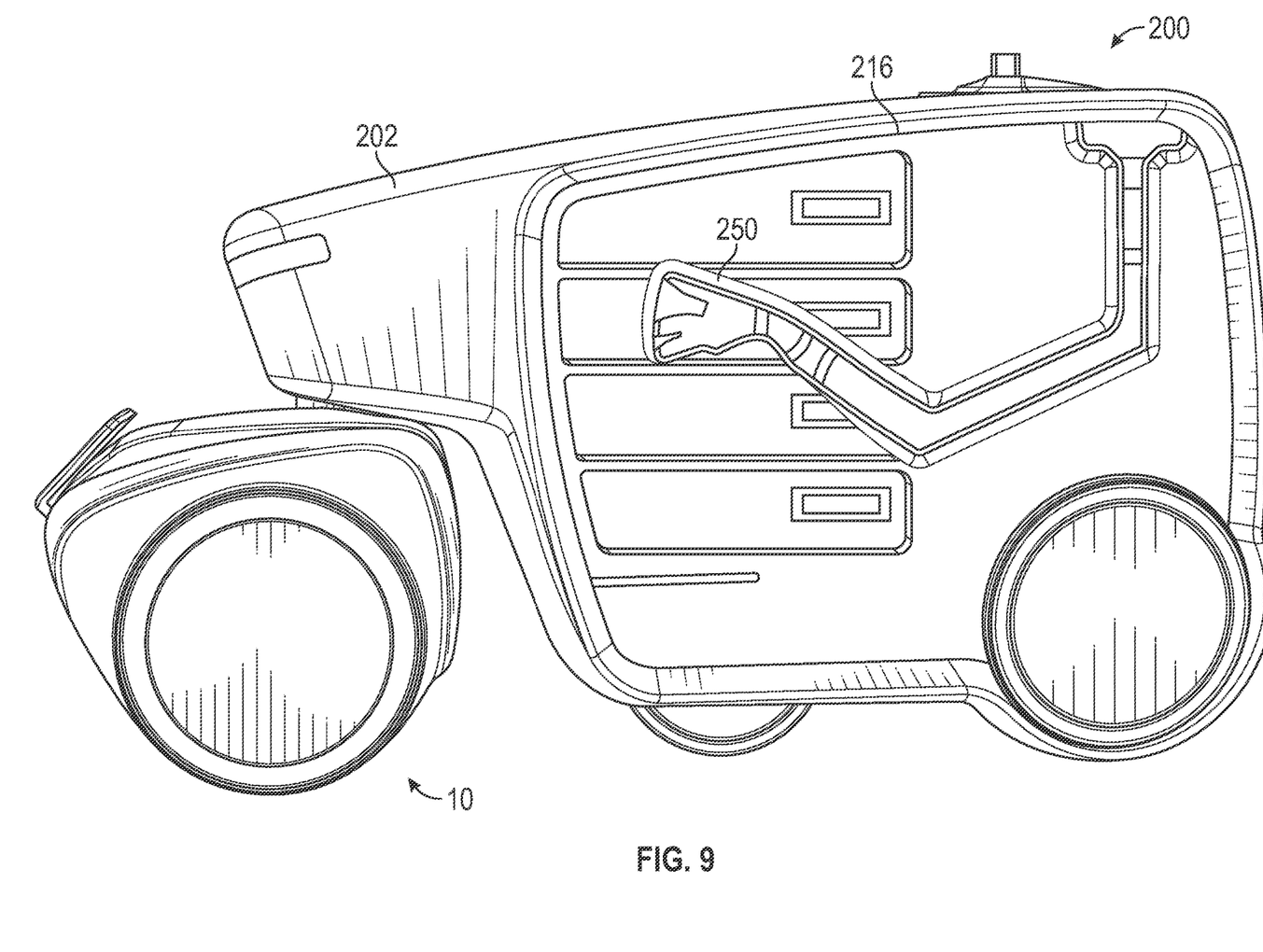
FIG. 9 is a side view of the autonomous vehicle and autonomous trailer with an item moving mechanism.
Figure 10:
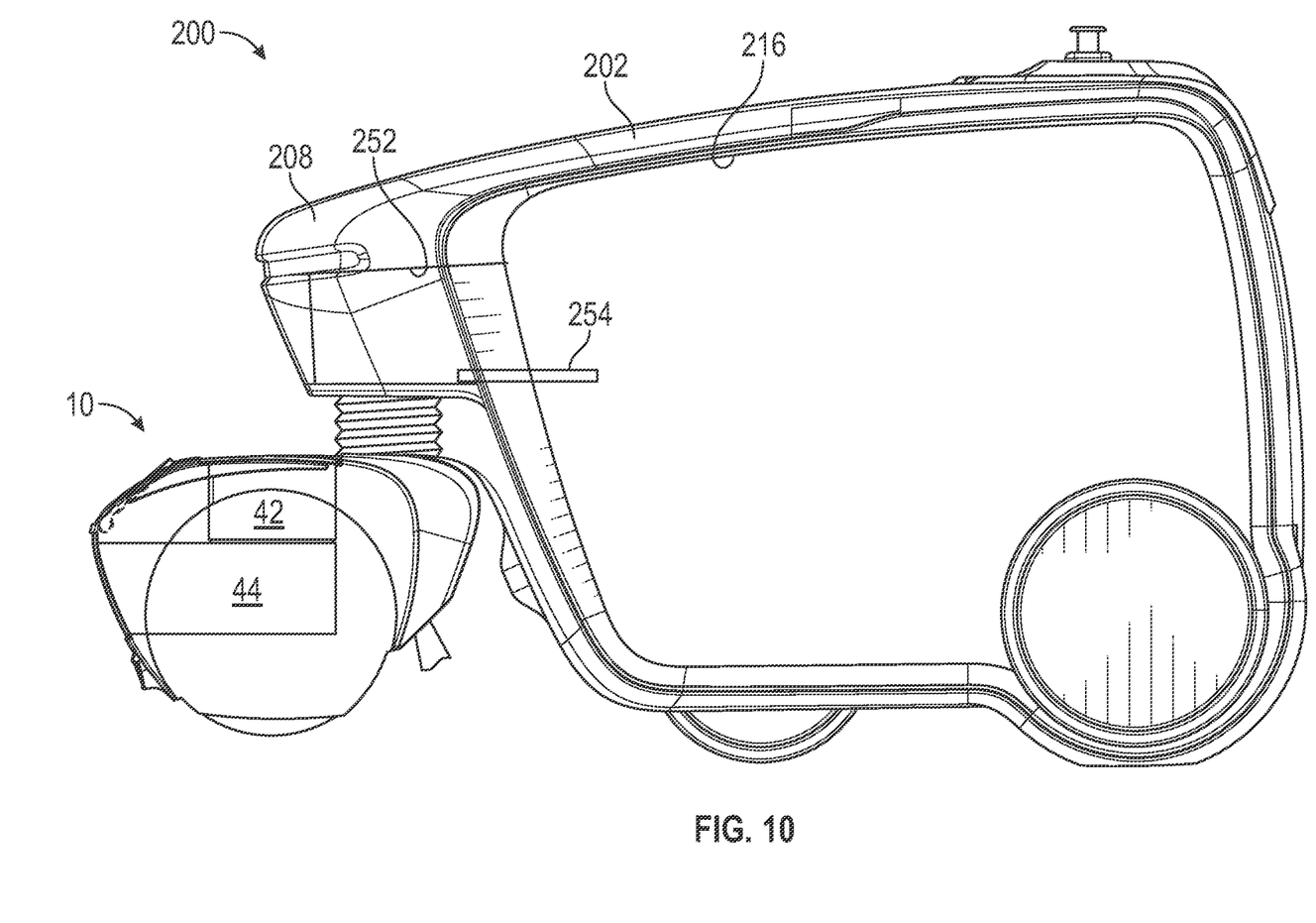
FIG. 10 is a schematic side view of the autonomous vehicle and autonomous trailer with another embodiment of an item moving mechanism.

With reference to FIGS. 9 and 10, in several embodiments the autonomous trailer 200 includes a means for autonomously moving an object between the autonomous vehicle 10 and the autonomous trailer 200. For example, as shown in FIG. 9, the autonomous vehicle may include a robotic manipulator 250 coupled to the housing 202. The robotic manipulator 250 is configured to grasp objects located within the storage space 216 and place them in the first or second compartments 44, 46 of the autonomous vehicle 10 and vice versa.

As another example, as shown in FIG. 10, the autonomous trailer 200 includes a passage 252 that communicates from the storage space 216, through the control section 208, and to the first compartment 44 of the autonomous vehicle 10. A mechanism 254, such as a robotic arm and/or conveyor belt, moves objects from the storage space 216 and through the passage 252 to drop the object into the first compartment 44.

The autonomous vehicle 10 and autonomous trailer 200 may be used to autonomously transport objects between locations. For example, a user or distribution system may order the autonomous vehicle 10 and autonomous trailer 200 to a location. The order may be made using a phone via V2D communication, as part of a distribution network using V2I communication, or any other method. The autonomous vehicle 10 then navigates to the destination location pulling the autonomous trailer 200 to the location. The autonomous trailer 200 may then place an object into the autonomous vehicle 10 for delivery at a location the autonomous trailer 200 cannot reach, such as areas accessible only by stairs or inside buildings. Thus, the autonomous vehicle 10 detaches from the autonomous trailer 200 and navigates to the final drop off location, as described above.

In another example, the autonomous trailer 100, 200 may act without the autonomous vehicle 10 to transport objects between locations. The autonomous trailer 100, 200 may use autonomous driving to follow a specific motor vehicle, thus acting as a remote trailer to the motor vehicle. For example, the autonomous trailer 100, 200 may use object detection and recognition via front sensors 226 to follow a particular license plate.

In another example, the autonomous trailer 100, 200 may act without the autonomous vehicle 10 to transport objects between locations inside a building. The autonomous trailer 100, 200 may use autonomous driving to follow a person walking inside, for example, a hospital or a parking structure, thus acting as a remote trailer to the person. The autonomous trailer 100, 200 may use object detection and recognition via front sensors 226 to follow a particular person.

In yet another example, the autonomous trailer 100, 200 may act without the autonomous vehicle 10 to transport objects between locations by using autonomous driving to follow a bicycle or a motorbike, thus acting as a remote trailer to a two wheel or three wheel operated vehicle. For example, the autonomous trailer 100, 200 may use object detection and recognition via front sensors 226 to follow a motorbike or a bicycle.

Figure 11A:
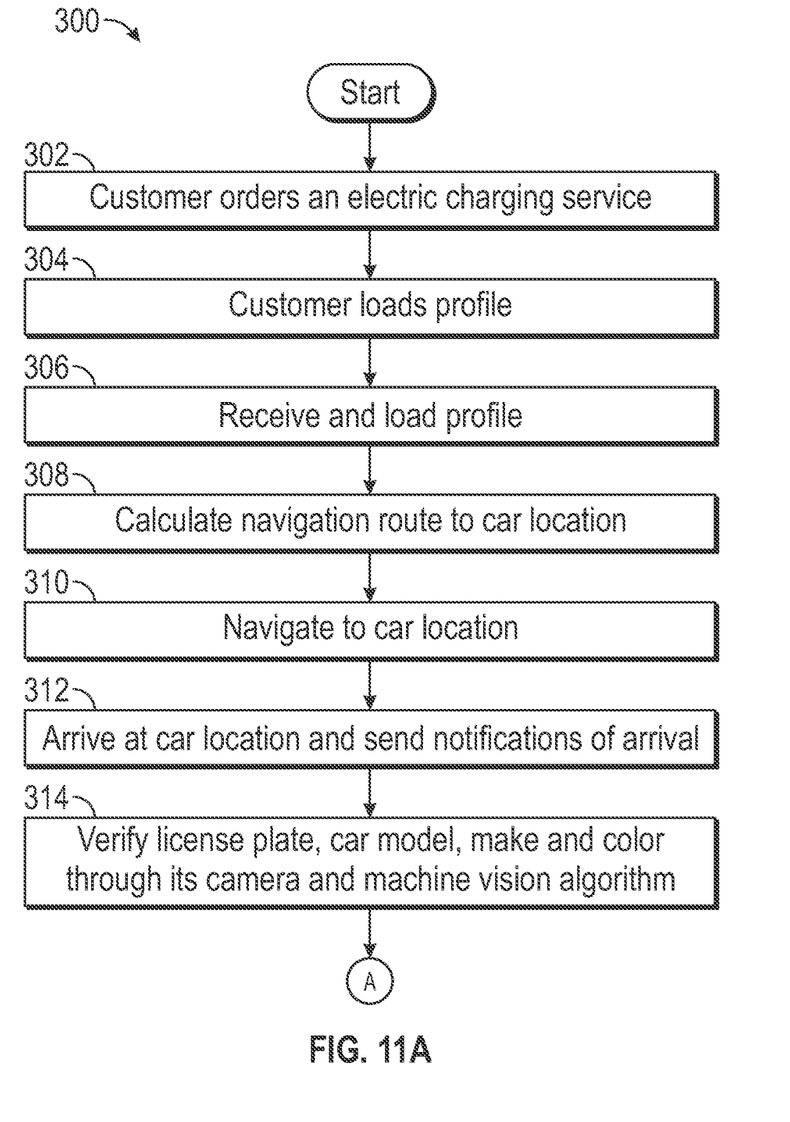
FIGS. 11A, 11B, and 11C are a flow chart illustrating a method for delivering a charging trailer to a destination using the autonomous vehicle and trailer.
Figure 11B:
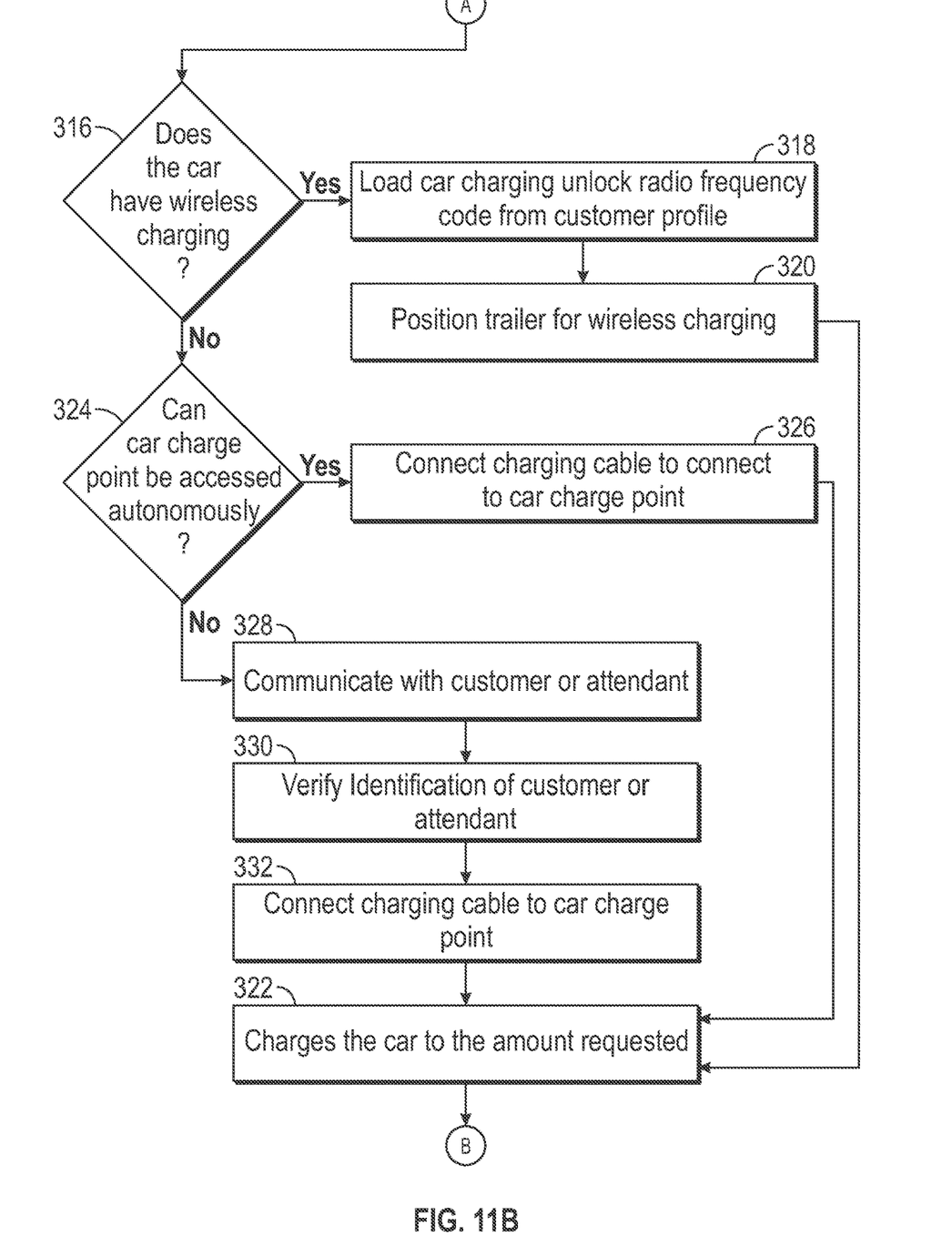
Figure 11C:
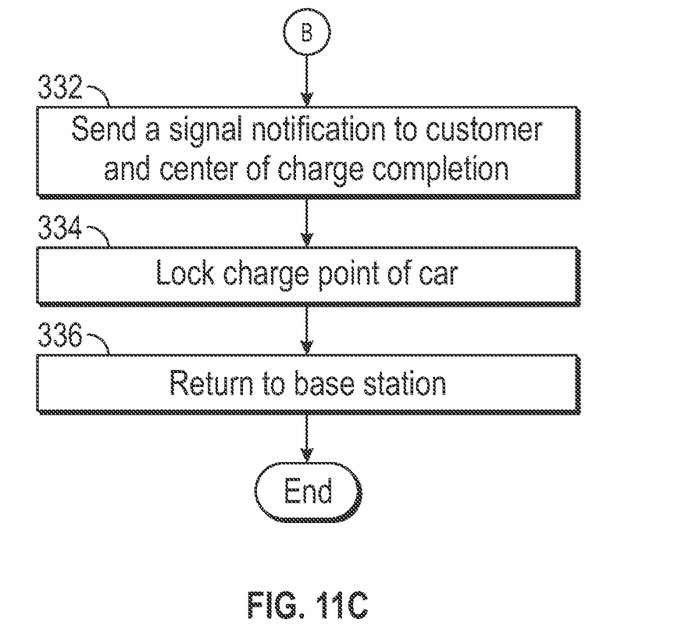

Turning now to FIGS. 11A-C, a method for using the autonomous vehicle system described above to autonomously deliver a charging station to a destination motor vehicle and to charge the motor vehicle is indicated by reference number 300. The method 300 may be used with the autonomous vehicle 10, the autonomous vehicle 10 and the trailer 100, the autonomous vehicle 10 and the trailer 200, or the trailer 200. In each instance, the trailer 100, 200 is loaded with batteries sufficient to charge an electric motor vehicle. By way of example, the method 300 will herein be described using the autonomous vehicle 10 and the trailer 200. The method 300 begins at step 302 where a customer orders an electric charging service. The order may be placed via an application on a device, via an internet portal, or directly with a vendor. At step 304 the loads a customer profile, along with the order, to a server. The customer profile includes identification information, the make, model and license plate number of the destination motor vehicle, the location of the destination motor vehicle, a time of delivery, electric charging unlock permission information including a wireless unlock charging code or a charging inlet unlock code, electric charge amount, and any special instructions. The server is remote from the autonomous vehicle 10 and the trailer 200 and is in communication with both. The server is configured to act as an application host to store information and provide command and control signals to the autonomous vehicle 10 and trailer 200. Command and control may include using a human operator interfacing with software or autonomously using software alone.

At step 306 the autonomous vehicle 10 and trailer 200 loads the customer profile received from the vendor. At step 308 the autonomous vehicle 10 and trailer 200 calculates a route from the current location of the autonomous vehicle 10 and trailer 200 to a location of the destination motor vehicle where the order is to be filled. At step 310 the autonomous vehicle 10 and trailer 200 navigates autonomously to the vendor location. Once the autonomous vehicle 10 and the trailer 200 arrives at the vendor location a notification of arrival is communicated to the customer and/or the server at step 312.

At step 314 the autonomous vehicle 10 and trailer 200 verifies the identify of the destination motor vehicle. In one example, verification of the identity includes determining a license plate number, vehicle model, make, and color using a camera and a machine vision algorithm and comparing this information to the customer profile to determine a match.

At step 316 the autonomous vehicle 10 and trailer 200 determines if the destination motor vehicle is equipped with wireless charging. This information may be part of the customer profile or determined via a lookup table based on the make and model of the destination motor vehicle. If the destination motor vehicle has wireless charging the method 300 proceeds to step 318 where the autonomous vehicle 10 and/or trailer 200 transmits the wireless unlock charging code to the destination motor vehicle to allow for wireless charging. The autonomous vehicle 10 and trailer 200 then maneuvers to position the trailer 200 in a wireless charging position relative to the destination motor vehicle. The method then proceeds to step 322 where the trailer 200 charges the destination motor vehicle to the requested charge amount.

If the destination motor vehicle is not equipped for wireless charging the method 300 proceeds to step 324 where the autonomous vehicle 10 and trailer 200 determines if the charging inlet of the destination motor vehicle is accessible autonomously. This information may be part of the customer profile or determined via a lookup table based on the make and model of the destination motor vehicle. If the destination motor vehicle has a charging inlet that is accessible autonomously, the method 300 proceeds to step 326 where the autonomous vehicle 10 and trailer 200 maneuver to allow the robotic manipulator 250 to connect a charging cable from the trailer 200 to the charging inlet of the destination motor vehicle. The method then proceeds to step 322 where the trailer 200 charges the destination motor vehicle to the requested charge amount.

If the charging inlet is not accessible autonomously, for example the charging inlet is blocked or stuck, the method proceeds to step 328 where the autonomous vehicle 10 and trailer 200 sends a notification to the customer or a $3^{rd}$ party attendant indicating that autonomous charging has been blocked and requesting assistance. At step 330 if the customer or $3^{rd}$ party attendant is available to assist the autonomous vehicle 10 and trailer 200 verifies the identification of the customer or $3^{rd}$ party attendant. The verification and identification may be through an application on a personal device that communicates with the autonomous vehicle 10 and trailer 200, voice identification, facial recognition using the display assembly 16, or a code entered into the display assembly 16. At step 332 the customer or attendant connects the charging cable of the trailer 200 to the charging inlet of the motor vehicle. The method 300 then proceeds to step 322 where the trailer 200 charges the destination motor vehicle to the requested charge amount.

Next, at step 332, once the destination motor vehicle has been charged to the requested amount, the autonomous vehicle 10 and trailer 200 sends a notification to the customer and server that the charge is complete. At step 334 the autonomous vehicle 10 and trailer 200 or attendant/customer disconnects the charging cable and locks the charging inlet of the destination motor vehicle. At step 336 the autonomous vehicle 10 and trailer 200 returns to a base station or repeats the method 300 for another customer and electric vehicle.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for charging an electric motor vehicle based on a customer order using an autonomous vehicle having electric battery storage, the method comprising:
   receiving a request to charge the electric motor vehicle;
   loading into a memory accessible by the autonomous vehicle a customer profile that includes a location of the electric motor vehicle, a vehicle identifier, a time of delivery, a charging inlet unlock code or wireless unlock charging code, and an electric charge amount;
   autonomously driving to the location of the electric motor vehicle;
   identifying the electric motor vehicle based on the vehicle identifier;
   charging the electric motor vehicle
   determining whether the electric vehicle is equipped with wireless charging and transmitting the wireless unlock charging code to the electric motor vehicle if the electric motor vehicle has been identified and the electric motor vehicle is equipped with wireless charging;
   determining whether a charging inlet of the electric vehicle is accessible by the autonomous vehicle if the electric motor vehicle is not equipped with wireless charging; and
   transmitting the charging inlet unlock code if the charging inlet is accessible, maneuvering the autonomous vehicle relative to the electric motor vehicle, and using a robotic manipulator to connect a charging cable from the autonomous vehicle to the electric motor vehicle.

2. The method of claim 1 wherein the vehicle identifier is selected from the group consisting of a stored make and model of the electric motor vehicle and a stored license plate number of the electric motor vehicle.

3. The method of claim 2 wherein verifying the identification of the electric motor vehicle includes using a camera to read a license plate number of the electric motor vehicle and comparing the license plate number of the electric motor vehicle to the stored license plate number of the electric motor vehicle.

4. The method of claim 2 wherein verifying the identification of the electric motor vehicle includes using a camera to read a make and model of the electric motor vehicle and comparing the make and model of the electric motor vehicle to the stored make and model of the electric motor vehicle.

5. The method of claim 1 further comprising maneuvering the autonomous vehicle relative to the electric vehicle to allow for wireless charging.

6. The method of claim 1 further comprising notifying the customer or an attendant if the charging inlet is not accessible.

7. The method of claim 6 further comprising verifying an identity of a customer or an attendant and transmitting the charging inlet unlock code to the electric motor vehicle if the customer or attendant identity has been verified.

8. The method of claim 7 wherein verifying the identity of the customer or the attendant includes using an application on a personal device that communicates with the autonomous vehicle, voice identification, facial recognition, or a code entered into the autonomous vehicle.

9. The method of claim 1 wherein the charging the electric motor vehicle includes charging the electric motor vehicle to the charge amount.

10. The method of claim 1 wherein the autonomous vehicle includes a trailer having electric storage capacity sufficient to charge an electric motor vehicle.

11. The method of claim 1 further comprising communicating a notification to the customer when the autonomous vehicle has arrived at the location of the electric motor vehicle.

12. The method of claim 1 further comprising communicating with the customer that the electric motor vehicle has been charged to the charge amount when the electric motor vehicle has been charged to the charge amount.

13. The method of claim 12 further comprising sending a charging inlet lock code or a wireless charging lock code after the electric motor vehicle has been charged to the charge amount.

* * * * *